US012795570B2

(12) United States Patent
Henry et al.

(10) Patent No.: US 12,795,570 B2
(45) Date of Patent: Nov. 10, 2026

(54) INTER-CLUSTER SYNCHRONIZATION VIA RELAY ANCHORS

(71) Applicant: Cisco Technology, Inc., San Jose, CA (US)

(72) Inventors: Jerome Henry, Pittsboro, NC (US); Robert E. Barton, Richmond (CA); Robert C. Badea, Broadview Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 18/426,142

(22) Filed: Jan. 29, 2024

(65) Prior Publication Data

US 2025/0247802 A1 Jul. 31, 2025

(51) Int. Cl.
*H04W 56/00* (2009.01)
*G01S 5/02* (2010.01)

(52) U.S. Cl.
CPC ....... *H04W 56/0015* (2013.01); *G01S 5/0284* (2013.01); *H04W 56/009* (2013.01)

(58) Field of Classification Search
CPC ............ H04W 56/0015; H04W 56/009; G01S 5/0284; G01S 1/024; G01S 1/68
See application file for complete search history.

(56) References Cited

U.S. PATENT DOCUMENTS

2015/0006633 A1 1/2015 Vandwalle et al.
2020/0287590 A1 9/2020 Torborg
2021/0159938 A1 5/2021 Subraveti et al.
2022/0171012 A1* 6/2022 Duan .................... G01S 5/0205
2023/0009717 A1* 1/2023 Bilstad .................. G01S 5/0284
2023/0171729 A1* 6/2023 Oh ...................... H04W 56/002 455/456.1
2023/0276401 A1* 8/2023 Reddy .................. H04W 64/00 455/456.1

(Continued)

FOREIGN PATENT DOCUMENTS

WO 2023089182 A1 5/2023

OTHER PUBLICATIONS

Bleesk: "Ultra-Wideband (UWB)", retrieved from https://bleesk.com/uwb.html, 2023, 10 Pages.

(Continued)

*Primary Examiner* — Schquita D Goodwin
(74) *Attorney, Agent, or Firm* — Patterson + Sheridan, LLP

(57) ABSTRACT

Disclosed are a system and method for synchronizing a first cluster of anchors with a second cluster of anchors so that anchors in the first and second clusters operate on a time base that is nearly the same among the anchors. An anchor acting in the first cluster starts with a first time-synchronization event, such as a poll request, and awaits responses from anchors in the first cluster. Upon receiving the first synchronization event, one of the anchors in the first cluster relays the event to one of the anchors in the second cluster. That anchor then performs a second time-synchronization event and awaits responses from the anchors in the second cluster. Relaying the synchronization event is a single, short message employing two-way ranging. The relaying avoids transmitting many messages among the anchors, resulting in a more accurate time base among the anchors.

20 Claims, 11 Drawing Sheets

(56) References Cited

U.S. PATENT DOCUMENTS

| | | | | |
|---|---|---|---|---|
| 2023/0276403 | A1 | 8/2023 | Reddy et al. | |
| 2023/0422193 | A1* | 12/2023 | Ye | H04W 56/0015 |
| 2026/0082359 | A1* | 3/2026 | Wang | H04W 56/001 |

OTHER PUBLICATIONS

FIRA: "How UWB Works", retrieved from https://www.firaconsortium.org/discover/how-uwb-works, 2023, 2 Pages.

FIRA: "UWB Secure Ranging in FIRA", Fira Consortium, Aug. 2022, retrieved from https://www.firaconsortium.org/sites/default/files/2022-08/FIRA-Whitepaper-UWB-Secure-Ranging-August-2022.pdf, 14 Pages.

FIRA: "What UWB Does", retrieved from https://www.firaconsortium.org/discover/what-uwb-does on 2023, 2 Pages.

IEEE: "Illustration-of-single-and-double-sided-two-way-ranging", 2018, 1 Page.

Laaraiedh M., et al., "One-way-ranging-OWR-versus-two-way-ranging-TWR", Cramer-rao Lower Bounds for Nonhybrid and Hybrid Localization Techniques in Wireless Networks, European Transactions on Telecommunications, 2011, 1 Page.

* cited by examiner

| UCI Parameter | Value |
|---|---|
| Session ID | x02 |
| Device Type | x01 = Controller |
| Ranging Round Usage | x01 = SS-TWR |
| Multi Node Mode | x00 = One to One |
| Device Mac Address | x02 |
| Destination Mac Address | x03 |
| Slot Duration | 2 ms |
| Ranging Duration | 2 ms |
| Device Role | x01 = Initiator |
| Slots Per Ranging Round | x01 = 1 slot |
| Scheduled Mode | x01 = Time Scheduled Mode |
| Session Priority | x02 – 2nd – Highest Priority (FIFO Operation) |
| Ranging Round Control | Bits 0 - 6 |
| Session Time Base | Bits 0-1, Octet 1-5, Octet 5-8 |

Figure 4B

| UCI Parameter | Value |
|---|---|
| Session ID | x03 |
| Device Type | x01 = Controller |
| Ranging Round Usage | x05 = OWR DL-TDOA |
| Multi Node Mode | x00 = One to Many |
| Number of Controlees | x05 |
| Device Mac Address | x03 |
| Destination Mac Address | x02 |
| Slot Duration | 2 ms |
| Ranging Duration | 14 ms |
| Device Role | x07 = DT-Anchor |
| Slots Per Ranging Round | x07 = 7 slots |
| Scheduled Mode | x01 = Time Scheduled Mode |
| Session Priority | x03 – 3rd – Highest Priority (FIFO Operation) |
| DL TDOA Ranging Method | 0x01 DS-TWR |
| Session Time Base | Bits 0-1, Octet 1-5, Octet 5-8 |

Figure 4C

INTER-CLUSTER SYNCHRONIZATION VIA RELAY ANCHORS

TECHNICAL FIELD

Embodiments presented in this disclosure generally relate to Ultra-wideband (UWB) networks. More specifically, embodiments disclosed herein relate to ranging in UWB networks to maintain an accurate time base among anchors in the UWB network.

BACKGROUND

Ultra-wideband (UWB) networks are similar to other broadcast networking protocols in that UWB has physical, MAC, and application layers. IEEE standard 802.15.4z specifies the physical layer (PHY), the MAC layer, and sublayers for ad hoc connectivity with fixed devices (anchors), portable devices, and moving devices with limited energy consumption requirements and supports real-time precision ranging capability that is accurate to within a few centimeters. Precision ranging depends on an accurate time base being maintained among the devices in the USB network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 4B depicts the settings for anchor 2 of FIG. 4A, according to embodiments.

FIG. 4C depicts settings for anchor 3 of FIG. 4A, according to embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
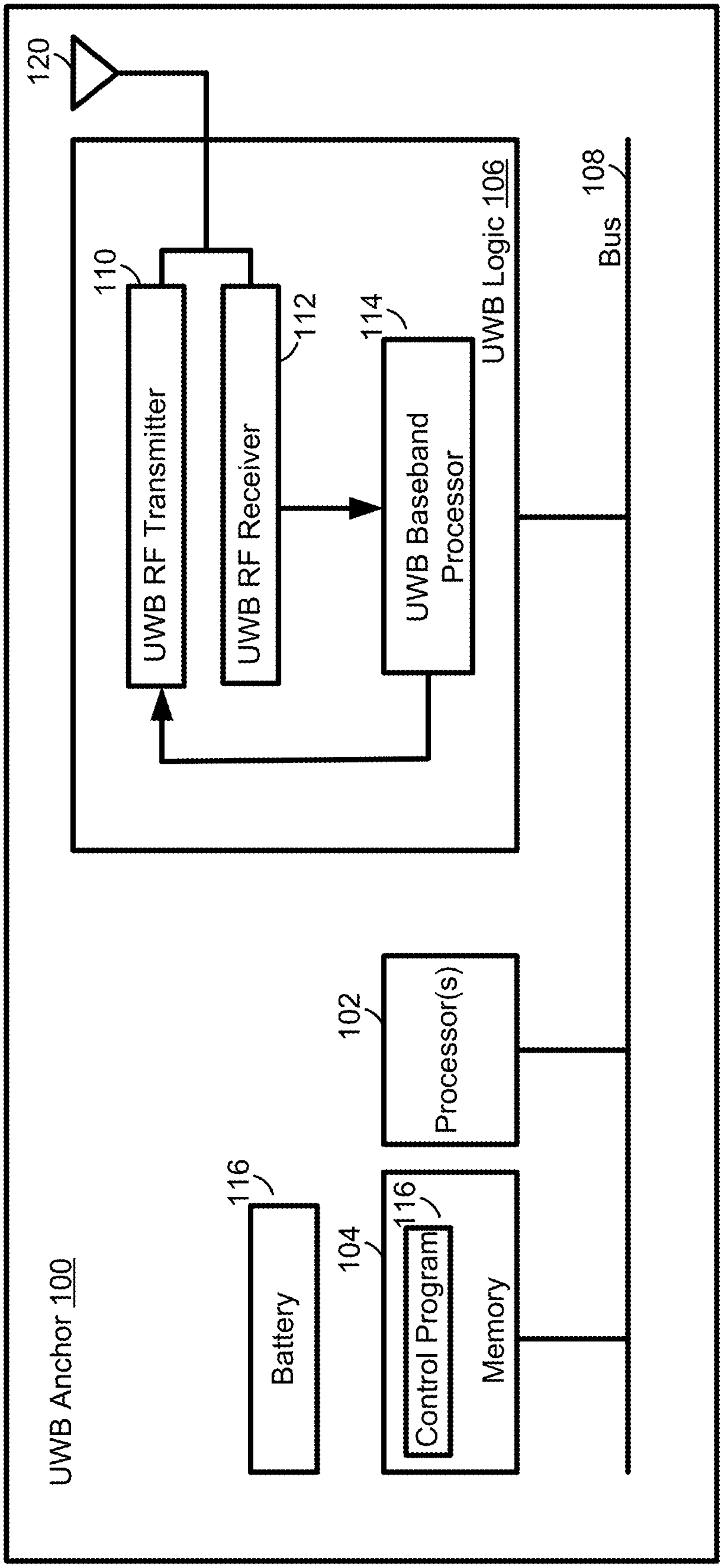
FIG. 1A depicts a block diagram of a UWB anchor device.

One embodiment presented in this disclosure is a method of synchronizing a first cluster of anchors with a second cluster of anchors. The method includes receiving a first time-synchronization event by a first anchor of the first cluster of anchors, where the first time-synchronization event was initiated by a second anchor of the first cluster of anchors during a first session in which anchors of the first cluster of anchors provided first responses, relaying the first time-synchronization event to one anchor of the second cluster of anchors during a second session, where the relayed time-synchronization event causes the one anchor of the second cluster of anchors to initiate a second time-synchronization event during a third session of the second cluster of anchors and to obtain second responses to the second time-synchronization event from anchors of the second cluster of anchors.

Another embodiment presented in this disclosure is a system that includes a first cluster of anchors and a second cluster of anchors. A first anchor in the first cluster of anchors is configured to initiate a first time-synchronization event to which the other anchors of the first cluster of anchors respond during a first session. A second anchor in the first cluster of anchors, upon receipt of the first time-synchronization event in the first session, is configured to relay the first time-synchronization event to one anchor in the second cluster of anchors during a second session. The one anchor in the second cluster of anchors initiates a second time-synchronization event during a third session, in which anchors of the second cluster of anchors respond during the third session.

Yet another embodiment presented in this disclosure is a non-transitory computer-readable medium encoding instructions, which, when executed by a processor of a first anchor of a first cluster of anchors, cause the first anchor of the first cluster of anchors to: receive a first time-synchronization event of the first cluster of anchors, where the first time-synchronization event was initiated by a second anchor of the first cluster of anchors in a first session in which anchors of the first cluster of anchors provided first responses; and relay the first time-synchronization event to one anchor of a second cluster of anchors in a second session, where the relayed time-synchronization event causes the one anchor of the second cluster of anchors to initiate a second time-synchronization event in a third session of the second cluster of anchors and to obtain second responses to the second time-synchronization event from anchors of the second cluster of anchors.

EXAMPLE EMBODIMENTS

Access points equipped with an ultra-wideband (UWB) radio provide a network of anchors which actively beacon wireless synchronization messages for client devices to listen to and calculate their time difference of arrival (TDOA) to the anchors as part of a ranging/location resolution service. To accurately calculate location, errors in the clock offsets between anchors need to be corrected when anchors transmit their messages (that is, when multiple anchors transmit, their time stamps need to be accurately aligned). Alignment is accomplished through a double-sided, two-way-ranging exchange between anchors (DS-TWR), depicted below in FIG. 2.

With prior knowledge of their physical locations within the floor plan shared at a higher network level (e.g., controller plane), the anchors can correctly calculate and correct for the relative time offset between each other's clocks such that the client device takes the difference in the timestamps included in the MAC of the PPDU layer of the wireless sync messages transmitted by the anchors during their DS-TWR synchronization.

To accurately calculate their location and deal with a lack of precision in a 3D environment, a device is required to include at least four unique downlink time difference of arrival (DL-TDOA) measurements in its calculation.

Therefore, DL-TDOA is typically performed in clusters for four to six anchors, with one anchor acting as the controller and the others as responders. This process, commonly referred to as DL-One Way Ranging (DL-OWR), facilitates the intra-cluster synchronization of anchors.

FIG. 1A depicts a block diagram of a UWB anchor device. The UWB anchor device 100 can be, for example, a standalone UWB anchor device or a peripheral UWB anchor device (part of another device, such as an access point). The UWB anchor device 100 includes bus 108, which interconnects UWB logic 106, one or more processors 102, and a memory 104.

UWB logic 106 includes a UWB RF transmitter 110, a UWB RF receiver 112, and a UWB baseband processor 114.

The processors 102 can be microprocessor(s) and/or microcontroller(s)).

The memory stores a control program 116 for operating the MAC and PHY layers of the UWB anchor.

Figure 1B:
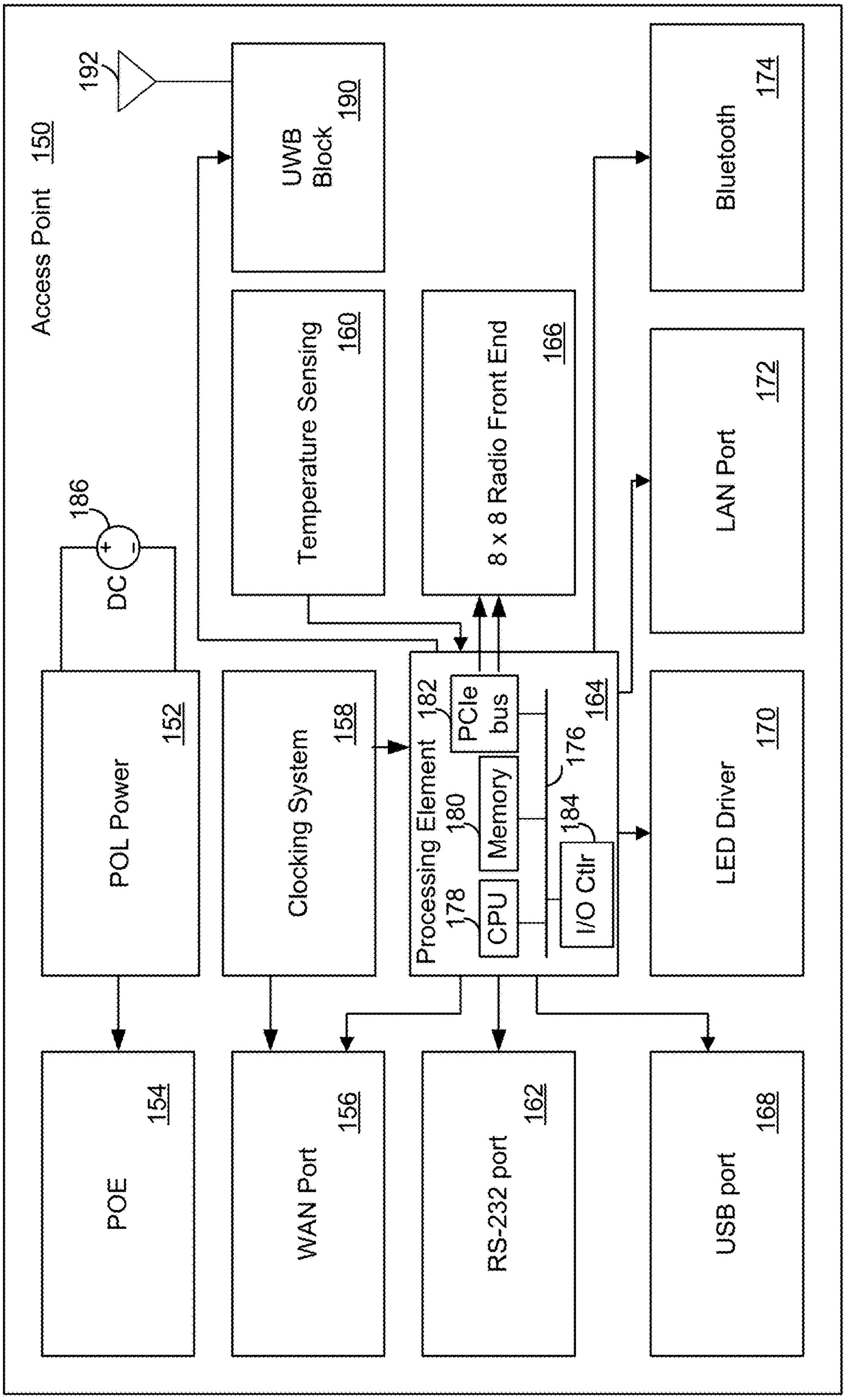
FIG. 1B depicts a block diagram of an access point (AP) with a UWB block.

FIG. 1B depicts a block diagram of an access point (AP) with a UWB block. The AP 150 includes a processing element 164 and several ports or connection facilities, such as a WAN port 156, USB port 168, RS-232 port 162, LAN port 172, and Bluetooth 174. Also included are a clocking system 158 and an 8×8 radio front-end 166 with a transmitter and receiver, which are coupled to eight external antennas. Auxiliary modules include a temperature sensing module 160, a power module 152 connected to a DC power source 186, a power over Ethernet (POE) module 154, LED driver 170, and a UWB antenna 192 coupled to UWB block 190, which is similar to UWB anchor device 100. Processing element 164 includes a CPU 178 and memory 180, a peripheral control interconnect express (PCIe) bus controller 182 for connecting to the 8×8 radio front-end 166, and an I/O controller 184, all coupled to each other via bus 176.

Figure 2:
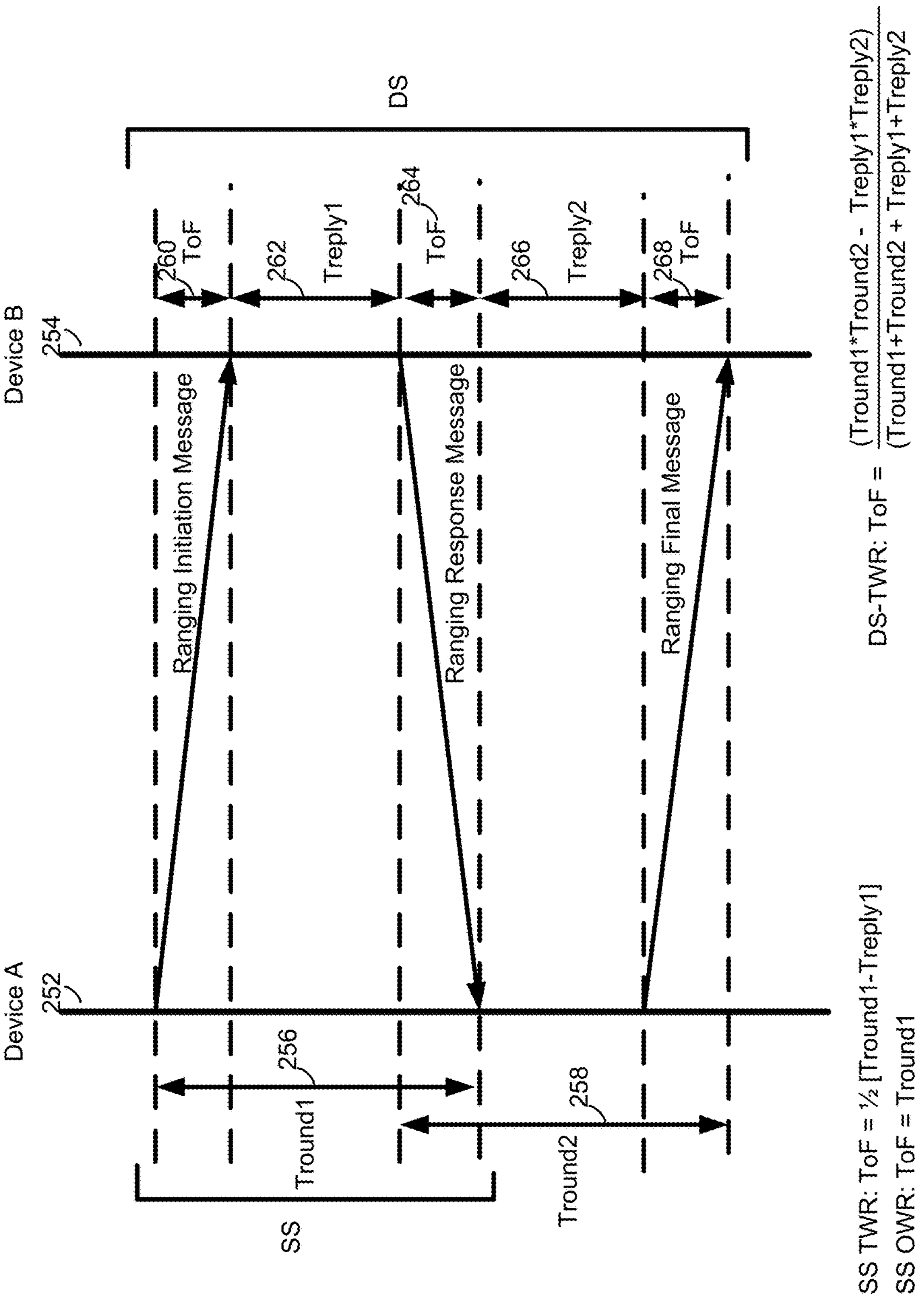
FIG. 2 depicts various UWB-ranging techniques.

FIG. 2 depicts various UWB-ranging techniques, including single-sided one-way ranging (SS-OWR), single-sided two-ray ranging (SS-TWR), and double-sided, two-way ranging (DS-TWR). In SS-OWR, the time of flight (ToF or TDOA) is derived from a single round trip (Tround1 256) from device A 252 to device B 254, which includes a ranging initiation message (i.e., a poll message) sent by an initiator and a ranging response message sent by a responder. Because Tround1=2*ToF+Treply1. Because the round trip Tround1 includes the responder's reply time 262, ToF via SS-OWR may be inaccurate.

In SS-TWR, the ToF is derived from Tround1 256 but accounts for the reply time (Treply1 262) by the device (device B 254) responding to the range initiation message and is thus more accurate. The computed ToF becomes (Tround1−Treply1)/2, which equals ToF or TDOA.

In DS-TWR, the ToF 260, 264, 268 is derived from two rounds (Tround1 256, Tround2 258). The computed ToF becomes $$\frac{Tround1 * Tround2 - Treply1 * Treply2}{Tround1 + Tround2 + Treply1 + Treply2}$$

and is more accurate due to the two rounds.

When a large number of devices are situated in an area, the use of DL-TDOA is generally required for large portions of the area. If UWB is provided on a single channel (UWB Channel 9) in a Wi-Fi infrastructure, collisions between clusters that create interference are to be avoided. Thus, DL-TDOA clusters are partitioned into scheduled blocks that perform ranging sequentially in a time-division multiple access (TDMA) fashion. Also, synchronization of time bases among clusters is needed to maintain their block schedules; otherwise, over time, blocks could tend to drift into the wrong time slots and ruin the network DL-TDOA schedule.

Figure 3:
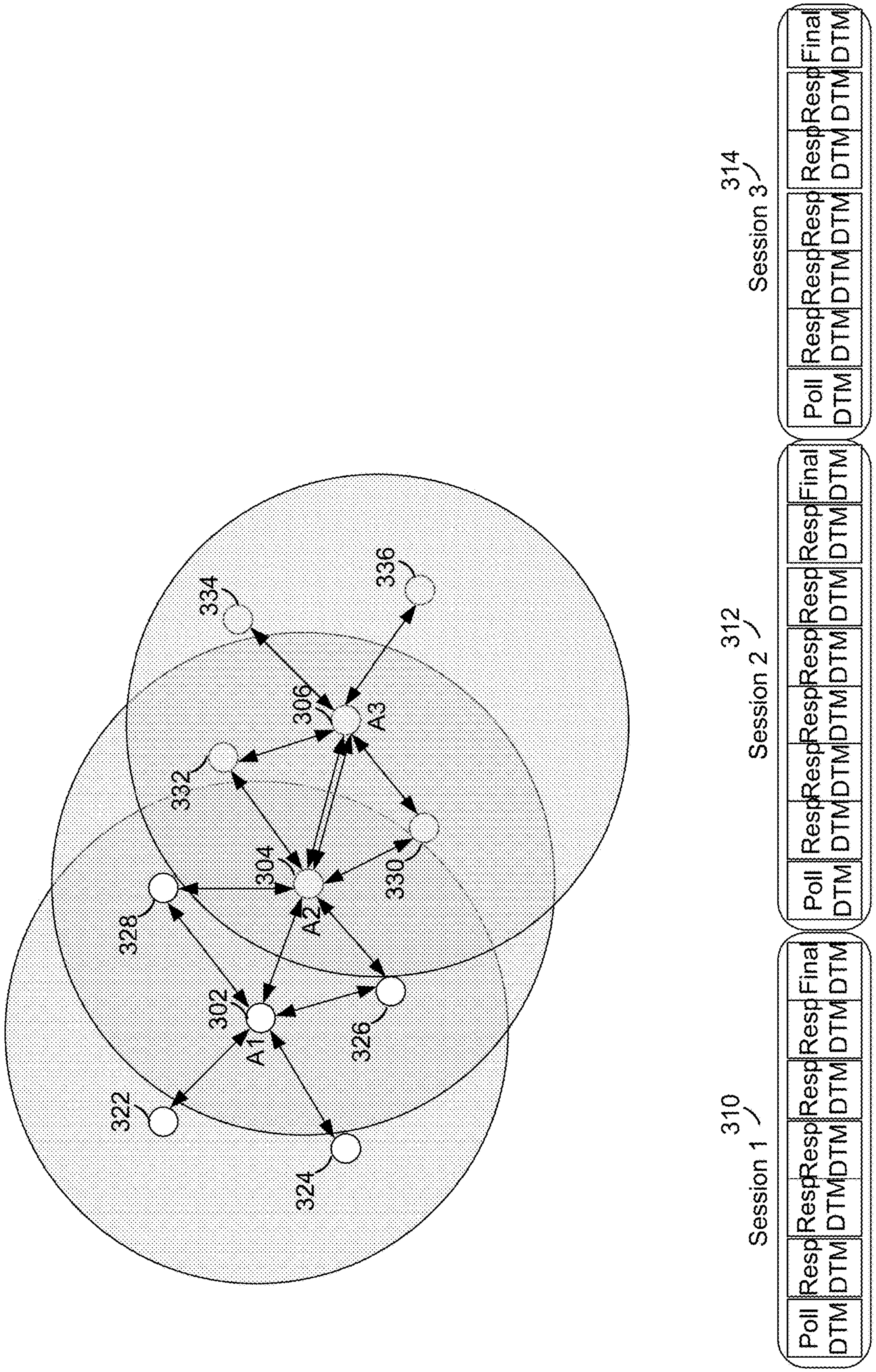
FIG. 3 depicts inter-cluster synchronization with a single time reference through a linked chain of OWR controllers and responders.

FIG. 3 depicts inter-cluster synchronization with a single time reference through a linked chain of OWR controllers and responders. According to the figure, there are three OWR sessions. In the first session (Session 1 310), anchor 1 (A1 302) sends out a range initiation message (i.e., a poll request) to a first cluster of anchors (302, 322, 324, 326, 328, and 304), where a cluster of anchors includes an initiator and responders within the range of the initiator. In response to the poll request, each responder within the range of A1 302 sends its response. As shown, with five responders 322, 324, 326, 328, 304 in the first cluster of anchors, each taking 2 milliseconds (ms) and a final taking 2 ms, the total time for a response is 14 ms.

After the first session, a second session (Session 2, 312) starts with anchor 2 (A2) 304 sending out a poll request and waiting for each responder (302, 326, 328, 332, 330, 306) and a final 2 ms in a second cluster of anchors for a total time of 16 ms in session 2. The coverage of A2 304 overlaps with the coverage of A1 302.

A third session (Session 3 314) starts after the second session 312. Anchor 3 (A3 306) starts the session with a poll request and waits for the responses from responders 332, 334, 336, 330, and 304 and a final of 2 ms in a third cluster of anchors for a total time of 14 ms in session 3. The coverage of A3 306 overlaps with the coverage of A2 304.

Thus, it can be seen that three clusters, three sessions, and a total time of 44 ms are needed to complete the synchronization. This operation is inefficient because it takes too long and requires too many messages and clusters. In addition, if a link budget is needed between clusters, such an arrangement limits the construction of the clusters, causing the cluster density to become large and to have substantial overlap among clusters.

Figure 4A:
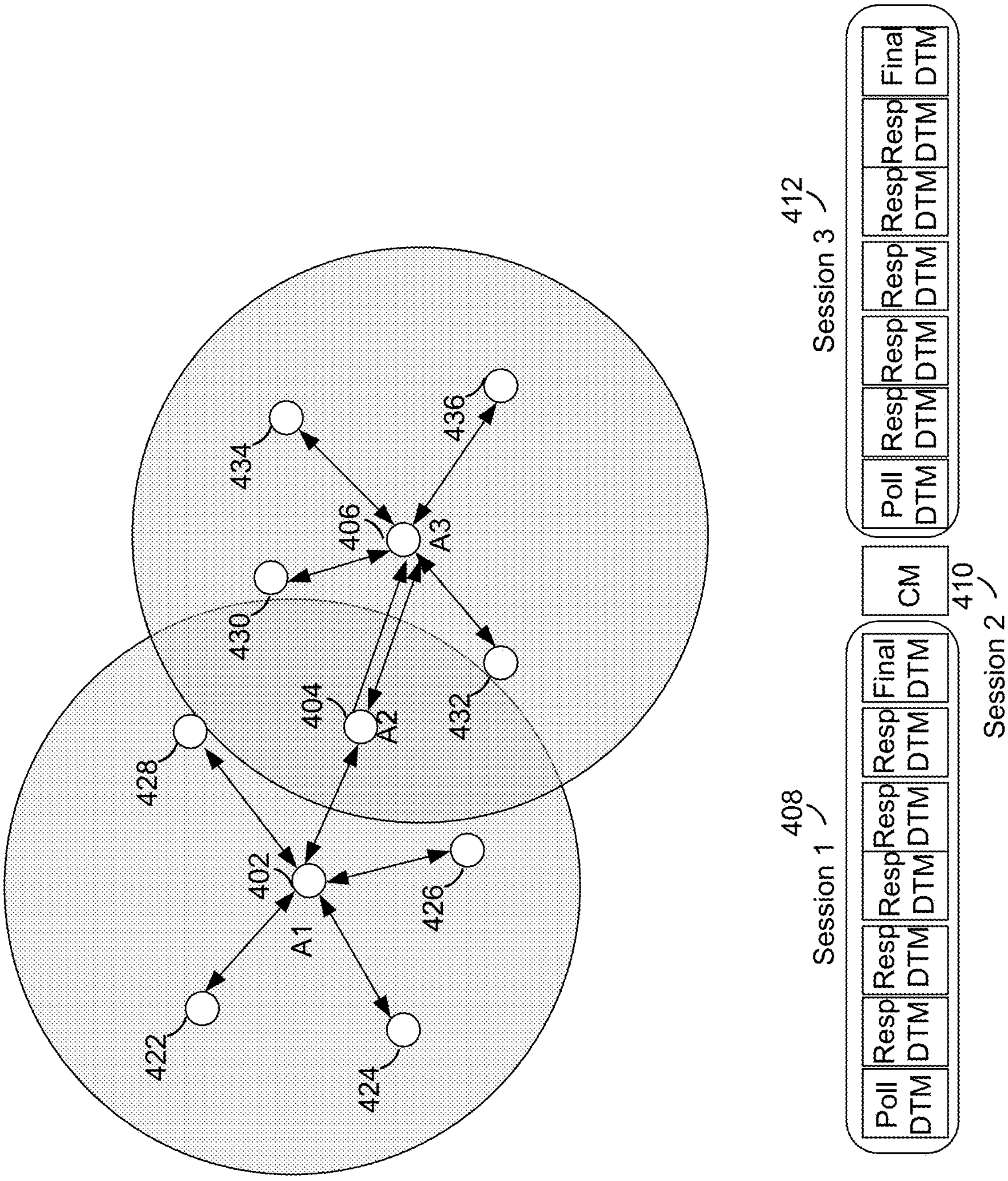
FIG. 4A depicts three sessions, according to embodiments.

FIG. 4A depicts three sessions, according to embodiments. Session 1 408 and session 3 412 are SS-OWR ranging sessions. Session 2 410 is an SS-TWR session.

In session 1 408, anchor 1 (A1 402) sends a poll request (i.e., a first time-synchronization event) to initiate the ranging. In response to the poll request, each responder within the range of A1 sends its response. As shown, with five responders 422, 424, 426, 428, 404 in a first cluster of anchors, each taking 2 ms and a final taking 2 ms, the total time for the first session is 14 ms.

After session 1 408, session 2 410 starts, but one of the responders, anchor 2 (A2 404), shared between coverage of A1 and anchor 3 in session 1 408, acts as a relay to send the request to anchor 3 (A3 406) for session 3 412. The relaying of the request takes only 2 ms and is an SS-TWR session. Session 2 has a lower priority than session 1 but a higher priority than session 3.

In response to the relayed request, session 3 412 starts, with A3 406 sending out a poll request (i.e., a second time-synchronization event) and receiving responses from responders in its range. As shown, with five responders 404, 430, 432, 434, 436 in a second cluster of anchors, the session takes for the second responses is 14 ms. Thus, the total time for the three sessions is 30 ms, and there are only two clusters. Each of the first responses in session 1 and the second responses in session 3 includes an adjusted clock offset calculation and adjusted transmission timestamps.

FIG. 4B depicts the settings for anchor 2 of FIG. 4A, according to embodiments. As indicated, the device type is "controller," the ranging round usage is SS-TWR, the multi-node mode is "one to one," the device MAC address is 02, the destination MAC address 03, the slot duration is 2 ms, the ranging duration is 2 ms, the device role is "initiator," the slots per ranging round is 1 slot, the scheduled mode is "Time Scheduled Mode" and the session priority is $2^{nd}$ highest priority (FIFO operation).

In addition to the above frame format, each relay anchor appends its own ID as it relays the message. To avoid the possibility of looping back to a previous anchor, a relay first examines if it has seen the message before from another anchor or if the number of relays in the change has been exceeded.

The bits in the ranging round control are set so that Bit 0 indicates "no ranging result report message," Bit1 indicates to include a control message, Bit 2=0, Bit 3 a custom user setting to exclude the ranging period, and Bits 4-5 indicate a radio frequency unit (RFU) and Bit 6, when 0, indicates no Multi-Range Precision (MRP).

The bits in the session time base are set to that Bit 0="Enable," Bit 1 indicates "stop if reference session is not active," Octet 1-5 indicates the "reference session id," and Octet 5-8 indicates the "session starts 14,000 us after the reference session poll."

In this example, anchor 2 404 acts both as the controller and initiator for this relay SS-TWR session, and anchor 3 406 is the destination address for its message. Session 2 is a point-to-point communication session and is complete in a single message exchange, so the block duration is equal to the slot duration, 2 ms.

Further in this example, in the ranging round control, the ranging result report message and measure report phases are excluded from the exchange. Bit 3, generally reserved for custom user control schemes, is also used to disable the ranging period, which includes the ranging initiation message from anchor 2 404 and the ranging response message from anchor 3 406. Thus, all that is included in this session is a control message (SPO) from anchor 2 404 to anchor 3 406.

The time base for this session is configured to reference session id=1, with an offset of 14,000 us. This means that the initiator (anchor 2 404) schedules itself to transmit the first frame of the session control message (CM) approximately 14 ms after receiving the pool from anchor 1 402 in session 1. Hence, anchor 2 404 is a participant in session 1.

FIG. 4C depicts settings for anchor 3 of FIG. 4A, according to embodiments. As indicated, the device type for A3 is "controller," the ranging round usage is OWR DL-TDOA, the number of controllers is 5, the device MAC address is 03, the destination MAC address is 02, the slot duration is 2 ms, the ranging duration is 14 ms, the device role is DT-Anchor, the slots per ranging round are 7 slots (1 poll, 5 responses, 1 final response), the session priority is $3^{rd}$ highest priority, the DL-TDOA is DS-TWR Message exchange.

The bits in the session time base are set to that Bit 0="Enable," Bit 1 indicates "Stop if reference session is not active," Octet 1-5 indicates the "Reference Session id," and Octet 5-8 indicates the "session starts 2,000 us after the reference session CM."

Thus, session 3 412 is an SS-TWR session in which anchor 3 406 acts as the controller and anchor 2 404 is a responder in the list of destination MAC addresses. The time base for this session references session 2 410, the modified SS-TWR session with an offset of 2 ms. So, session 3 412 schedules itself to begin 2 ms after anchor 3 406 receives the CM from the initiator in session 2 410 (anchor 2 404).

Anchor 2 404 serves its role as a relay anchor, which propagates the time base between the OWR cluster in session 1 and session 3. This method of time-base propagation is more efficient in that it requires a single message instead of potentially six to ten messages, which are primarily wasted as DL-TDOA coverage mostly overlaps. Also, the requirement of the OWR controller having a link budget can be onerous on the clustering generator and may result in "incomplete" or broken DL-TDOA cluster networks. In addition, the ability to relay the time base allows for more flexibility in environments with many obstructions.

Figure 5:
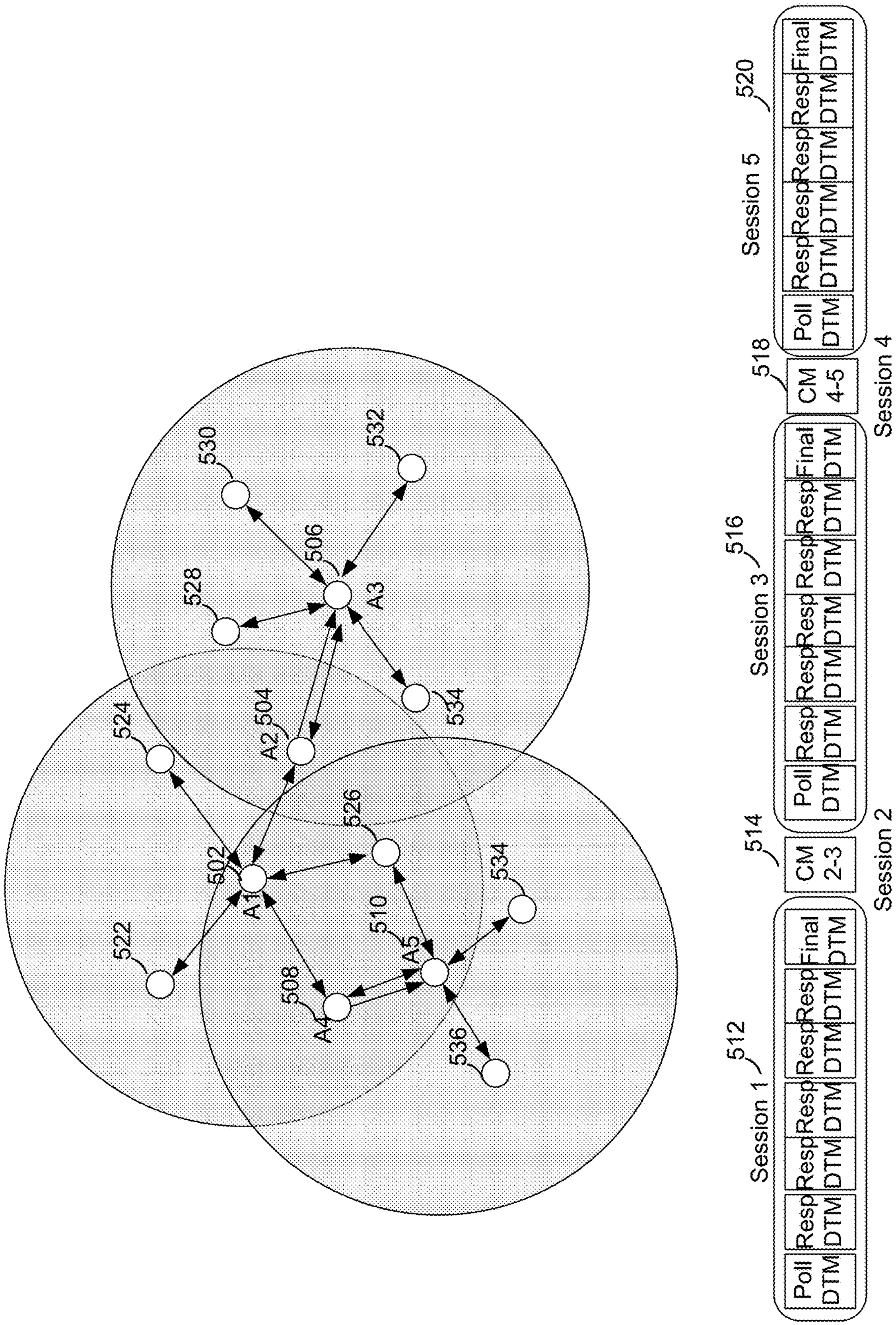
FIG. 5 depicts five sessions, according to embodiments.

FIG. 5 depicts five sessions, according to embodiments. In session 1 512, anchor 1 (A1 502) sends a poll request, initiating a ranging operation and awaiting responses from anchors 522, 524, 526, 504, 508. With each response taking 2 ms and a 2 ms final response, the total time for session 1 512 is 14 ms. Session 2 514 follows when anchor 2 (A2 504) relays the poll request to anchor 3 506. The relaying of the request takes 2 ms.

Anchor 3 (A3 506) receives the relayed request, initiates session 3 516, and awaits responses from anchors 504, 528, 530, 532, and 534. With the response taking 2 ms and a 2 ms final response, the total time for session 3 524 is 14 ms.

Anchor 4 (A4 508) receives a poll request from A1 502 concurrently with A2 504 receiving a poll request. A4 508 relays its poll request in session 4 518 to anchor 5 (A5 510) concurrently with A2 504 relaying its poll request to A3 506. A5 510 then initiates a poll request in session 5 520, but only after session 4 518 is completed and awaits responses from anchors 508, 526, 534, and 536. With each response taking 2 ms and a 2 ms final response, the total time for session 5 528 is 12 ms.

Thus, in the embodiment, there are three clusters and five sessions taking 44 ms.

Figure 6:
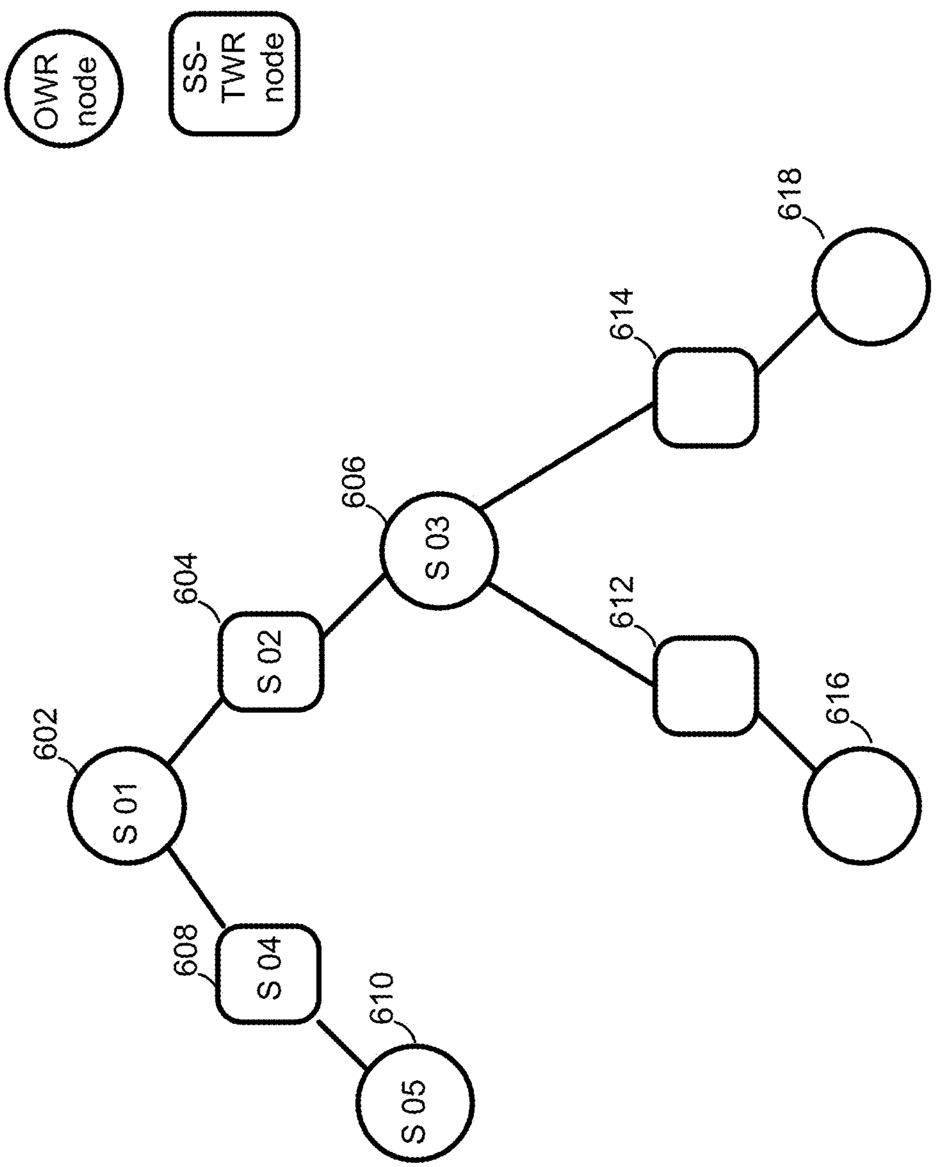
FIG. 6 depicts the sessions of FIG. 5 organized into a tree.

FIG. 6 depicts the sessions of FIG. 5 organized into a tree. The root node of the tree is anchor 1 602, which operates with OWR (which is indicated by a circle). Anchor 2 604 and anchor 4 608 are parallel branches of the tree and operate with SS-TWR (indicated by a box). Anchor 3 606 and anchor 5 610 are leaf nodes of the tree and operate with OWR.

Generally, any number of relay anchors with OWR and SS-TWR relay sessions can be organized into a tree structure. The length of the branches connecting the nodes is the time separation between the poll message or CM of the session and its connection. The tree is adjusted to have no overlapping sessions, have OWR nodes joined by SS-TWR nodes, and to minimize the total time. Limiting the total time reduces clock offset error between sessions while still scheduling sessions in TDMA format.

Figure 7:
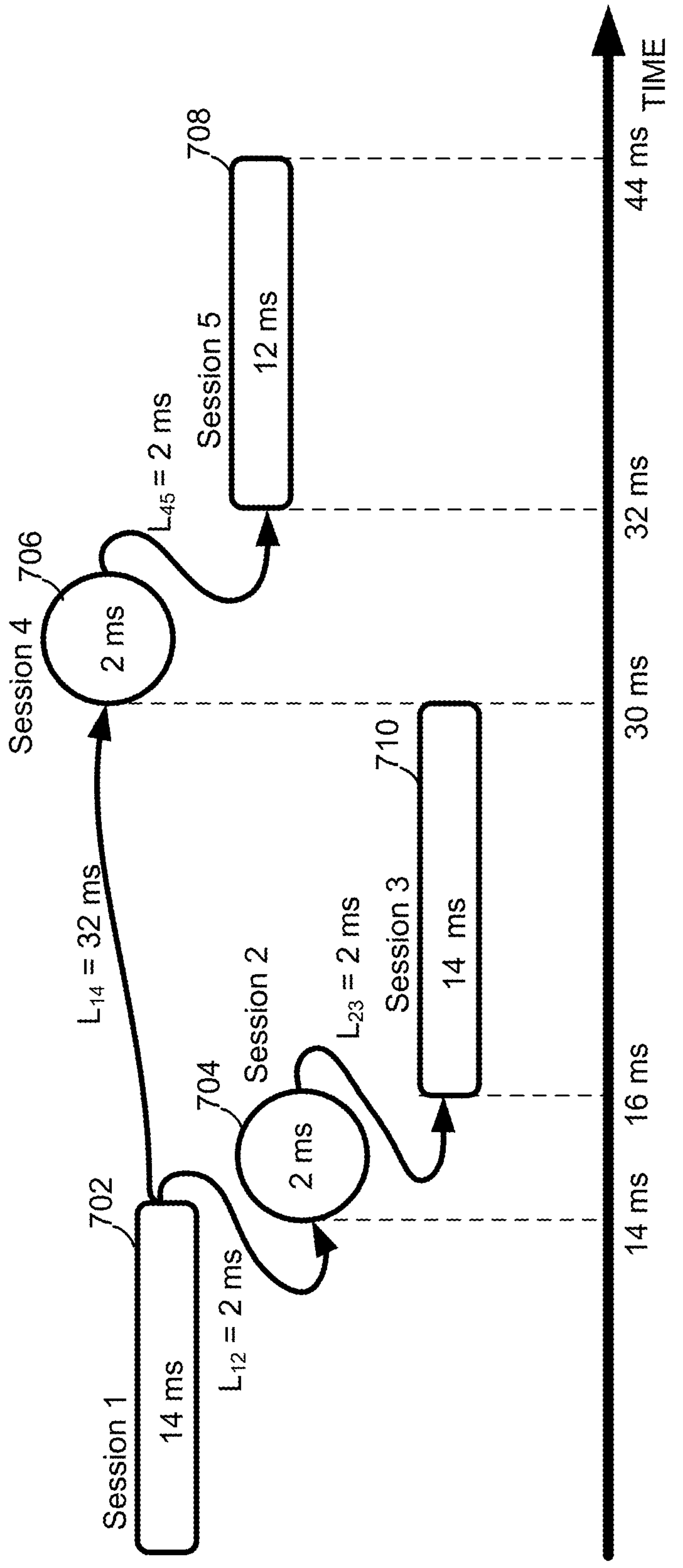
FIG. 7 depicts the operations of the tree in FIG. 6 in a timeline.

FIG. 7 depicts the operations of the tree in FIG. 6 in a timeline. After session 1 702, session 2 704 occurs, followed by session 3 710. When Session 3 710 is completed, session 4 706 occurs, followed by session 5 708. The timeline meets the goal of having no overlapping sessions and gives an indication of the total time.

Figure 8:
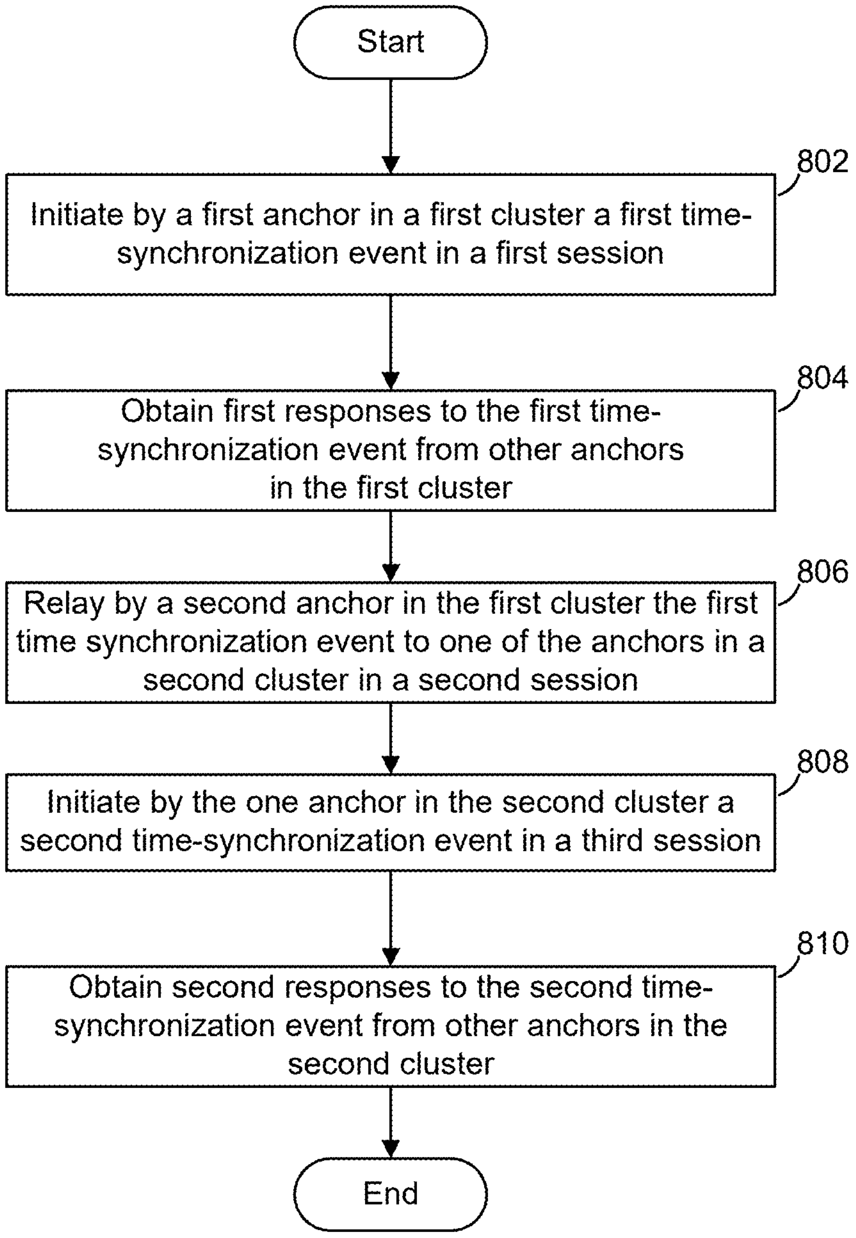
FIG. 8 depicts a flow of operations, according to embodiments.

FIG. 8 depicts a flow of operations, according to embodiments. In block 802, a first anchor initiates a first time-synchronization event, such as a poll request, in a first session. In block 804, the first anchor receives responses to the first time-synchronization event from responders within the range of the first anchor. In block 806, one of the responders to the first time-synchronization event operates as a relay in a second session to send the first time-synchronization event to an anchor in a second cluster with a range overlapping the range of the first anchor. The anchor in the second cluster, which receives the relayed message, initiates in block 808 a second time-synchronization event in a third session to which responders in the range of the anchor in the second cluster respond in block 810. In this manner, the time base is more quickly propagated to the anchors, and the propagated time base has less error.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer readable program code embodied thereon.

Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of synchronizing a first cluster of anchors with a second cluster of anchors, the method comprising:

receiving a first time-synchronization event by a first anchor of the first cluster of anchors, wherein the first time-synchronization event was initiated by a second anchor of the first cluster of anchors during a first session in which anchors of the first cluster of anchors provided first responses; and relaying the first time-synchronization event to one anchor of the second cluster of anchors during a second session, wherein the relayed time-synchronization event causes the one anchor of the second cluster of anchors to initiate a second time-synchronization event during a third session of the second cluster of anchors and to obtain second responses to the second time-synchronization event from anchors of the second cluster of anchors, wherein the first anchor of the first cluster of anchors also resides in the second cluster of anchors as a shared anchor between the first cluster of anchors and the second cluster of anchors, and wherein the first anchor acts as a responder in the first session and the third session.

2. The method of claim 1, wherein each anchor of the first cluster of anchors and the second cluster of anchors is an access point.

3. The method of claim 1, wherein the first time-synchronization event includes a one-way ranging session.

4. The method of claim 1, wherein the first time-synchronization event is a poll message sent by an anchor acting as a controller.

5. The method of claim 1, wherein the second anchor of the first cluster of anchors acts as a controller and the other anchors of the first cluster of anchors act as responders.

6. The method of claim 1, wherein the one anchor of the second cluster of anchors acts as a controller and the other anchors of the second cluster of anchors act as responders.

7. The method of claim 1, wherein the first session, second session, and third session are each associated with a priority level, and wherein the priority level of the second session is higher than the priority level of the third session and lower than the priority level of the first session.

8. The method of claim 7, wherein the shared anchor operates as a single-sided two-way ranging initiator.

9. The method of claim 1, wherein each of the first responses and the second responses includes an adjusted clock offset calculation and adjusted transmission timestamps.

10. A system comprising:

a first cluster of anchors; and a second cluster of anchors, wherein a first anchor in the first cluster of anchors is configured to initiate a first time-synchronization event to which anchors of the first cluster of anchors respond during a first session;

wherein a second anchor in the first cluster of anchors, upon receipt of the first time-synchronization event during the first session, is configured to relay the first time-synchronization event to one anchor in the second cluster of anchors during a second session; and wherein the one anchor in the second cluster of anchors initiates a second time-synchronization event during a third session, in which anchors of the second cluster of anchors respond during the third session, wherein the second anchor of the first cluster of anchors also resides in the second cluster of anchors as a shared anchor between the first cluster of anchors and the second cluster of anchors, and wherein the second anchor acts as a responder in the first session and the third session.

11. The system of claim 10, wherein each anchor of the first cluster of anchors and the second cluster of anchors is an access point.

12. The system of claim 10, wherein the first time-synchronization event includes a one-way ranging session.

13. The system of claim 10, wherein the shared anchor operates as a single-sided, two-way ranging initiator.

14. A non-transitory computer-readable medium encoding instructions, which, when executed by a processor of a first anchor of a first cluster of anchors, cause the first anchor of the first cluster of anchors to:

receive a first time-synchronization event of the first cluster of anchors, wherein the first time-synchronization event was initiated by a second anchor of the first cluster of anchors during a first session in which anchors of the first cluster of anchors provided first responses; and relay the first time-synchronization event to one anchor of a second cluster of anchors during a second session, wherein the relayed time-synchronization event causes the one anchor of the second cluster of anchors to initiate a second time-synchronization event during a third session of the second cluster of anchors and to obtain second responses to the second time-synchronization event from anchors of the second cluster of anchors, wherein the first anchor of the first cluster of anchors also resides in the second cluster of anchors as a shared anchor between the first cluster of anchors and the second cluster of anchors, and wherein the first anchor acts as a responder in the first session and the third session.

15. The non-transitory computer-readable medium of claim 14, wherein the first time-synchronization event includes a one-way ranging session.

16. The non-transitory computer-readable medium of claim 14, wherein the first time-synchronization event is a poll message sent by an anchor acting as a controller.

17. The non-transitory computer-readable medium of claim 14, wherein the first anchor of the first cluster of anchors acts as a controller and the other anchors of the first cluster of anchors act as responders.

18. The non-transitory computer-readable medium of claim 14, wherein the one anchor of the second cluster of anchors acts as a controller and the other anchors of the second cluster of anchors act as responders.

19. The non-transitory computer-readable medium of claim 14, wherein the shared anchor operates as a single-sided, two-way ranging initiator.

20. The non-transitory computer-readable medium of claim 14, wherein each of the first responses and the second responses includes an adjusted clock offset calculation and adjusted transmission timestamps.

* * * * *